United States Patent
Hotz et al.

(10) Patent No.: US 7,798,170 B2
(45) Date of Patent: Sep. 21, 2010

(54) FIELD ADJUSTABLE CONTROL VALVE ASSEMBLY AND FIELD ADJUSTMENT MODULE

(75) Inventors: Beat Hotz, Ridgefield, CT (US); Adrian I. Papanide, Shelton, CT (US)

(73) Assignee: Belimo Holding AG, Hinwil (CH)

( * ) Notice: Subject to any disclaimer, the term of this patent is extended or adjusted under 35 U.S.C. 154(b) by 1050 days.

(21) Appl. No.: 11/382,159

(22) Filed: May 8, 2006

(65) Prior Publication Data
US 2007/0012367 A1 Jan. 18, 2007

Related U.S. Application Data

(60) Provisional application No. 60/678,551, filed on May 6, 2005.

(51) Int. Cl.
*F16K 37/00* (2006.01)
(52) U.S. Cl. ............... 137/556.3; 251/285; 251/286
(58) Field of Classification Search ............. 137/556.3, 137/556, 553; 251/285–288
See application file for complete search history.

(56) References Cited

U.S. PATENT DOCUMENTS

| | | | | |
|---|---|---|---|---|
| 2,443,036 A | * | 6/1948 | Hopkins | ............... 251/285 |
| 2,514,431 A | * | 7/1950 | West | ............... 251/285 |
| 3,115,892 A | * | 12/1963 | Brewer | ............... 137/556.3 |
| 4,584,902 A | | 4/1986 | Fry | |
| 5,139,230 A | * | 8/1992 | Lester | ............... 251/285 |
| 5,329,959 A | * | 7/1994 | Owen et al. | ............... 251/286 |
| 5,348,271 A | * | 9/1994 | Owen et al. | ............... 251/285 |
| 5,385,167 A | * | 1/1995 | Owen et al. | ............... 251/286 |
| 6,729,602 B2 | | 5/2004 | Hankin et al. | |

* cited by examiner

*Primary Examiner*—John K Fristoe, Jr.
*Assistant Examiner*—Andrew J Rost
(74) *Attorney, Agent, or Firm*—Thaddius J. Carvis

(57) ABSTRACT

A flow setting assembly is provided to permit field adjustment of an electronically actuated flow control valve, particularly a pressure independent characterized control valve (PICCV). In a preferred form, flow can be field adjusted by using a hex tool. Therefore, the maximum flow can be increased or decreased within the valve's adjustable flow range. As with all high close-off valves that employ a ball in their design, the ball passes well into the seat when rotated to the actuator's zero-degree position. Therefore, there is an amount of travel within the first degrees of ball rotation that passes back over this seat. The flow setting assembly eliminates this excess rotation (12°) resulting in a closed position that is offset to improve control resolution and system accuracy. This offset continues to allow the high close-off rating of 200 PSI. MFT actuators electronically adjust to and maintain the 2-10 Volt control signal at the reduced angle, as well as the 100 second running time and feedback signal. On floating point (−3) actuators, the running time is constant but dependent on the overall angle of rotation.

20 Claims, 8 Drawing Sheets

FIELD ADJUSTABLE CONTROL VALVE ASSEMBLY AND FIELD ADJUSTMENT MODULE

RELATED APPLICATION AND PRIORITY CLAIM

This application claims priority to U.S. Patent Application No. 60/678,551, filed May 6, 2005 in the names of Beat Hotz and Adrian I. Papanide, the disclosure of which is hereby incorporated by reference in its entirety.

BACKGROUND OF THE INVENTION

The invention relates to valves, especially those suitable for HVAC applications, and mechanisms enabling adjustment of flow in the field. In particular, the invention provides mechanisms for use with valve actuators and control valves to enable field adjustment. In the preferred forms, the valves are of the pressure independent and characterized flow variety.

In HVAC plants, water distribution can be accomplished at constant or variable flow. Each type of distribution system has advantages and disadvantages. Today, variable flow systems using electronic 2-way control valves have become generally accepted as the industry standard due to their benefits, mainly reduced pumping cost achieved as a result of reducing pump head and flow. In addition, this type of system enables plants to be designed with a diversity factor because flow is only needed where energy is demanded. However, these systems are not without their disadvantages.

A very significant disadvantage with most systems in place today is that balancing the system is a very time consuming and costly effort. According to a flow design for typical systems, each control valve requires a balancing valve to adjust the hydronic circuit. The balancing procedure dictates the quality of the system and requires highly skilled technicians and tools. During the balancing, all control valves must be in their open position. However, as soon as the system is running, depending on different cooling or heating load requirements in the building, valves are permanently closing and opening which results in a dynamically changing system pressure. Balancing variable flow systems is time consuming and can be conducted only under "static" design conditions.

If terminals are added to a typical conventional system, the whole system needs to be rebalanced because some existing terminals must be throttled back. This is especially a problem where floors are periodically remodeled for new or existing tenants and the uses vary with each remodeling. Wherever the uses change, balancing of the whole system is required. Moreover, typically a building is running under design conditions only 1% of the time. The other 99%, the hydronic system needs to provide an average load of 50%. Thus, flow is reduced to 20%, and differential pressures across control valves increase. Since the CV-rating of the valve is typically sized for design conditions, the valve authority decreases and the modulating valve is downgraded to one acting open or close only. This makes hunting expected.

Control circuits are interactive. Therefore, when one control valve closes, the differential pressures on other circuits increases and the associated control valves must close to compensate. So when one or more loops become instable, control problems can spread to other control valves.

In typical current systems, if flow is higher than required, $\Delta T$ will decrease and result in a cooling plant with lower return temperatures to the chiller and reduce the efficiency. If one chiller cannot run at peak efficiency, it is more likely that the next chiller in a series will be forced to start sooner than required causing additional electricity and maintenance costs. The opposite happens in a condensing boiler where a higher return temperature can avoid the condensing process when the dew point of the exhaust gases cannot be achieved. The same phenomenon can happen in coils. In a heating coil for instance, overflow will result in a lower $\Delta T$ and decrease the coil's performance which can result in discomfort due too a low room temperature.

Significant developments in HVAC valves have been made in the recent past with the provision of characterized valves, in general, and particularly of the pressure independent variety. Because of these improvements the disadvantages of variable flow systems are largely eliminated for most HVAC-applications. The valves now available for HVAC applications include characterized openings where the degree of opening movement is proportional to flow rate. In U.S. Pat. No. 6,039,304, Carlson, et al., describes a ball valve with modified characteristics. The valve includes a disk for characterizing flow to permit a proportional opening of the valve to correspond to a predetermined flow rate. These valves can provide essentially "equal percent" characteristics, although other flow characteristics may be desired and achieved and are commercially under the identifier of CCV. They employ a disk that includes a shaped opening and has one side shaped to interface with and conform to the shape of the exterior of the ball or plug. The disk fits inside the port at the seat area, and is secured by a ring. The ability of a valve to provide a flow rate proportional to the movement of a valve actuator is of great advantage when manufacturing and installing both valves and the actuators. In many tests and surveys the CCV has outperformed globe valves due to true equal-percentage valve characteristic and higher close-off ratings.

It is also important for HVAC and other applications that control valves have the ability to maintain a constant flow rate despite pressure fluctuations in the system. Valves having this capability are now available. For example, in U.S. Pat. No. 6,827,100, to Carlson, there is described a pressure independent control valve, which enables an HVAC operator to set flow rates for any of a plurality of zones and have the selected rates remain constant independent of variations in pressure due to variations in heat transfer demand in the several zones. These valves are commercially available under the identifier of PICCV. This capability is the most important at part-load; for instance, when a PICCV with a nominal flow of 10 GPM operates at 3 GPM, a flow of 3 GPM is maintained. These valves are made in number of sizes; however, not all rated flow rates can be made practically. Where exact flow rates are necessary at levels between the available sizes, it is necessary to program an actuator to supply the desired percentage of the required flow rate. In a PICCV the CCV is combined with a differential pressure regulator. This regulator maintains a constant flow passing through the valve regardless of pressure variations in the system.

Actuators for control valves are typically set at the factory and can be modified upon installation to provide a desired maximum flow rate. The closed position is typically offset past the zero point by a preset amount to achieve a high close off rating. As with all high close-off valves that employ a ball in their design, the ball passes well into the seat when rotated to the actuator's zero-degree position. Therefore, there is an amount of travel within the first degrees of ball rotation that passes back over this seat. For an actuator having a 90° turn arc from full off to full on, it is typical for this offset to be as much as 12° or more, or about 13% of the travel of the actuator. This offset provides an unacceptable delay in some circuits.

Among actuators of wide use in HVAC applications are those are those available from Belimo Aircontrols USA as LR24-3 US, series actuators, which provide a 100 second run time, provide a 90° movement and employ an overload sensor to stop movement when the voltage exceeds a predetermined value. Also available are a series of advanced actuators available from Belimo Aircontrols USA as MFT actuators, which include the ability to be preset to a limited range of movement. These actuators comprise electric motors with electronic control circuitry which is programmed to utilize a 2-10 Volt control signal to provide a designated angle of movement over a 100 second running time. The MFT actuators include controllers for providing feedback control signals. On floating point actuators, the running time is constant but dependent on the overall angle of rotation. They will run for the full 100 second running time unless an overload due stopped travel is sensed and used as a signal to shut off the motor. The actuators are electronic and are programmed using a special piece of equipment or a software tool. Field adjustments are not a simple matter.

There is a present need for means having the capability of simple and effective field adjustment of control valves to adjust valves to achieve desired flow rates of less than the design value of the valves. In particular, there is a need to provide field adjustment capability for control valves that are fully characterized and are designed to be opened by control movements proportional to flow rate independent of pressure, the field adjustment preferably being by a simple mechanical adjustment with a readily available hand tool.

SUMMARY OF THE INVENTION

It is an object of the invention to provide means for simply and effectively making field adjustment of control valves to adjust valves to achieve desired flow rates.

It is another object of the invention to provide field adjustment capability for control valves that are fully characterized and are designed to be opened by control movements proportional to flow rate independent of pressure.

It is another object of the invention to provide a field adjustability to HVAC and other control valves by providing a module which can be added to control valves, particularly those which are characterized and pressure independent, to enable adjustability to flow rate by using a readily available hand tool.

It is an object of the invention to provide an adjustment module for control valves which can eliminate at least a part of the delay accompanying an offset of the close off position of the valve and the end point of actuator movement.

These and other objects are achieved by the present invention which provides a field adjustable control valve assembly and field adjustment module.

In one aspect, the invention provides a control valve assembly, especially of the type suitable for HVAC applications, comprising:
  (a) a control valve having a valve stem operably engaged with a valve element to move the valve element between open and closed positions by rotary movement of the valve stem;
  (b) a control valve actuator operably engaged with said valve stem to rotate said valve stem;
  (c) a field flow adjustment mechanism comprising an adjustment screw to move a mechanical open end point stop, said field adjustment mechanism being operably engaged with both said valve stem and said actuator to enable adjustment of the movement of said valve stem by said actuator, whereby maximum open flow through the valve can be set to a predetermined maximum rate by rotation of said adjustment screw.

In another aspect, the invention provides a field flow adjustment mechanism, comprising:
  (a) means for engaging a drive shaft of a control valve actuator;
  (b) means for engaging a control valve stem; and
  (c) an adjustment screw engaged with a mechanical open end point stop, whereby movement of said adjustment screw moves said mechanical open end point stop and thereby adjusts the movement of said valve stem by said actuator to a predetermined maximum rate.

In another aspect, the invention provides a control valve actuator which is enabled for field adjustment, comprising:
  (a) a control valve actuator including drive shaft means for engagement with a field adjustment mechanism; and
  (b) a field flow adjustment mechanism comprising
    means for engagement with said drive shaft of said control valve actuator and the valve stem of a control valve,
    an adjustment screw, and
    a mechanical open end point stop engaged with said adjustment screw, whereby movement of said adjustment screw moves said mechanical open end point stop and thereby adjusts to a predetermined maximum rate the movement which said actuator can exert on said valve stem.

In another aspect, the invention provides a control valve which is enabled for field adjustment to set a predetermined open stop position, comprising:
  (a) a control valve comprising
    a valve body defining an inlet and an outlet,
    a valve element positioned between said inlet and said outlet and having an opening therethrough,
    a valve stem operably engaged with said valve element to rotate said valve element within said valve body; and
  (b) a field flow adjustment mechanism comprising
    means for engagement with a drive shaft of a control valve actuator and said valve stem of said control valve,
    an adjustment screw, and
    a mechanical open end point stop engaged with said adjustment screw, whereby movement of said adjustment screw moves said mechanical open end point stop and thereby adjusts to a predetermined maximum rate the movement which said actuator can exert on said valve stem.

In each of these aspects of the invention, the preferred forms of control valve include those which are fully characterized and are designed to be opened by control movements proportional to flow rate independent of pressure. Other preferred aspects of the invention will be described below and are illustrated in the accompanying drawings.

BRIEF DESCRIPTION OF THE DRAWINGS

The invention will be better understood and its advantages will become more apparent when the following detailed description is read in light of the accompanying drawings, wherein.

DETAILED DESCRIPTION OF THE INVENTION

The invention relates to control valves and, in particular, provides mechanisms for use with valve actuators and control valves to enable field adjustment. In the preferred forms, the valves are of the pressure independent and characterized flow variety. These are the types for which the invention provides significant practical effect and are therefore described in some particularity below. The invention will, however, have advantage with valves and actuators not specifically shown or described, as will be fully apparent to those skilled in the art.

Figure 1A:
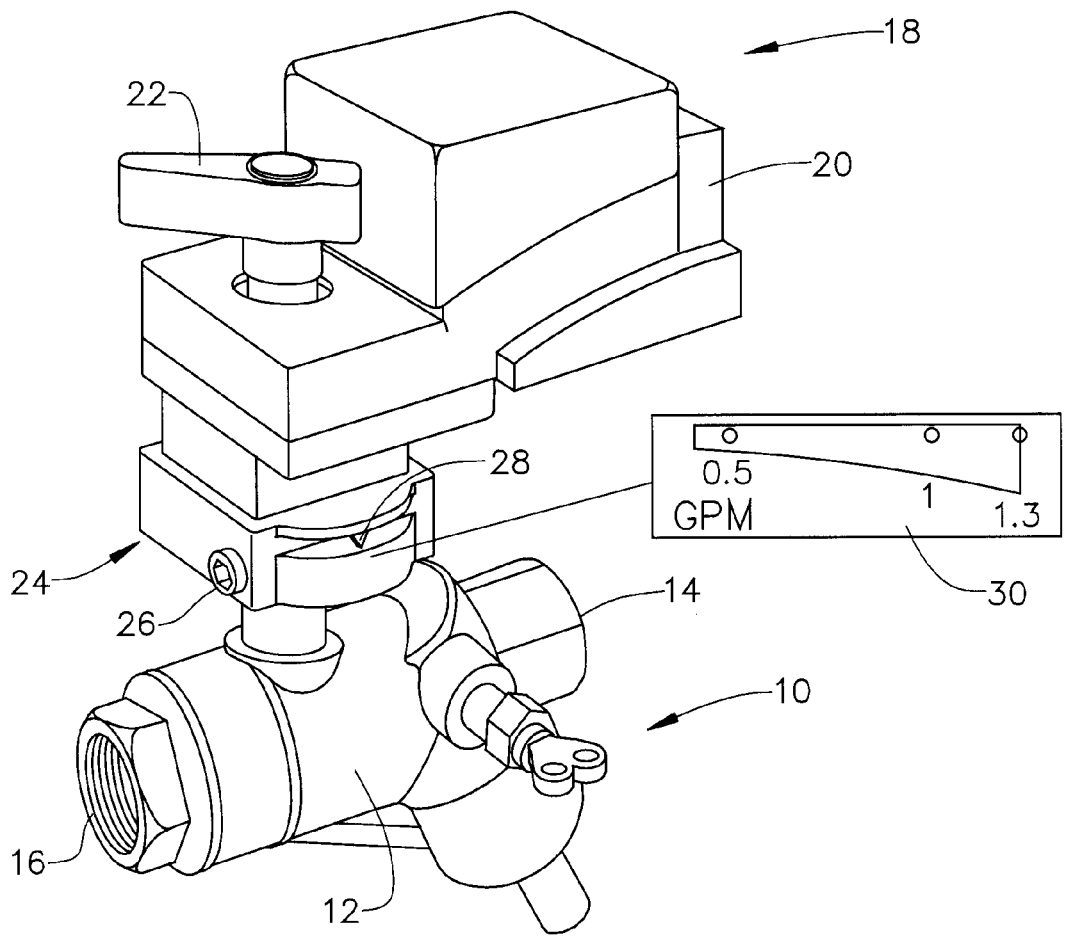
FIG. 1A is a perspective view, from the top and showing the front and left side, of a field adjustable pressure independent control valve assembly of the invention.
Figure 1B:
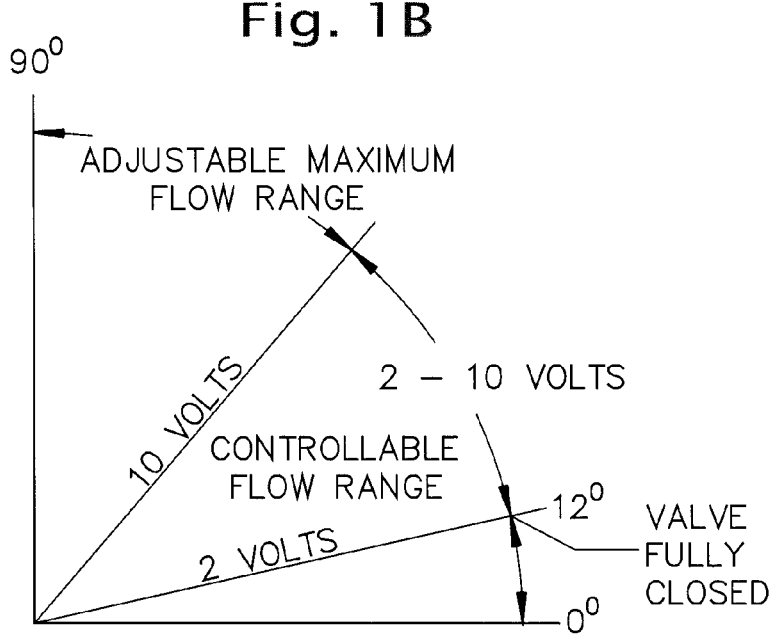
FIG. 1B is a graphic view illustrating the range of movement of an actuated pressure independent control valve assembly of the invention and its range of flow obtainable by field adjustment.

The invention will be described first with reference to FIGS. 1A to 3, which will provide an overall view of the improvements of the invention and the construction of a particular form of the invention, with emphasis on a preferred embodiment of a field flow adjustment mechanism. FIG. 1A is a perspective view, from the top and showing the front and left side, of a field adjustable pressure independent control valve assembly of the invention. Thus, in the description which follows, the relative directions will be taken relative to these references. It will be understood by those skilled in the art, however, that these references have no particular functional meaning and are to aid in making the description more understandable. A control valve 10 is illustrated as comprising a valve body 12, an inlet 14 and an outlet 16. The valve 10 is preferably of the PICCV type as available from Belimo Aircontrols USA. Valves of this type are described in the literature of Belimo Aircontrols USA as well as U.S. Pat. No. 6,827,100, to Carlson. They are available and will be preferably employed as fully characterized in terms of flow, by means as described in U.S. Pat. No. 6,039,304, to Carlson, et al. FIG. 1B is a graphic view illustrating the range of movement of an actuated pressure independent control valve assembly of the invention and its range of flow obtainable by field adjustment.

The view of FIG. 1A shows the control valve 10, the actuator 18, and field flow adjustment mechanism 24, in their final assembled configuration. An actuator 18, is shown to include an electronically controlled actuator drive motor 20 and a manual crank arm 22. The valve in this embodiment is closed by a clockwise movement of the crank arm 22. The movement between the fully open and fully closed position of the actuator and valve, without any other means provided, is a 90° clockwise movement. Between the actuator 18 and the valve 10 is a field flow adjustment mechanism 24. The field flow adjustment mechanism 24 enables the valve to be set in the field to a predetermined proportion of the maximum design flow for the valve. A field flow adjustment mechanism 24 is shown to include an adjustment screw 26 for engagement with a mechanical open end point stop (to be described), whereby movement of the adjustment screw 26 moves the mechanical open end point stop and adjusts the movement of the valve a predetermined maximum rate. A pointer 28 is shown for indicating on a scale (shown in detail as 30) the flow rate set. The scale can be molded into the body, painted on, attached as a label or otherwise provided.

Reference is now made again to FIG. 1B to illustrate this point. The graph shows the 90° design range of movement for the valve. A first 12° segment of this movement from the closed position is actually an excess movement of the ball or other valve element past the fully closed position. As with typical high close-off valves that employ a ball in their design, the ball passes well into the seat when rotated to the actuator's zero-degree position. Therefore, there is an amount of travel within the first degrees of ball rotation that passes back over this seat. The field flow adjustment mechanism of the invention can eliminate this excess rotation (12°, or any portion of it) resulting in a closed position that is offset to improve control resolution and system accuracy. This offset continues to allow the high close-off rating of 200 PSI. The currently preferred actuator type for actuator 18, is of the LR24-3 US series but the MFT type offer additional advantages due to sophistication of control. Both types are available from Belimo Aircontrols USA and can electronically adjust to and maintain the 2-10 volt control signal at the reduced angle, as well as the 100 second running time and feedback signal. On floating point (-3) actuators, the running time is constant but dependent on the overall angle of rotation. In the graph of FIG. 1B, a significant amount of the maximum flow range is removed, leaving only a predetermined angular movement (shaded) where the control voltage of 2-10 volts can adjust to any desired angle within the shaded area. The actuator can sense an overload occurring as the rotation is stopped prior to reaching the full 90° end point and will shut down. The MFT actuator can then utilize the full 2-10 volt control signal to achieve any predetermined position within the range as permitted by the mechanical stops provided by the field flow adjustment mechanism 24 of the invention.

Figure 2:
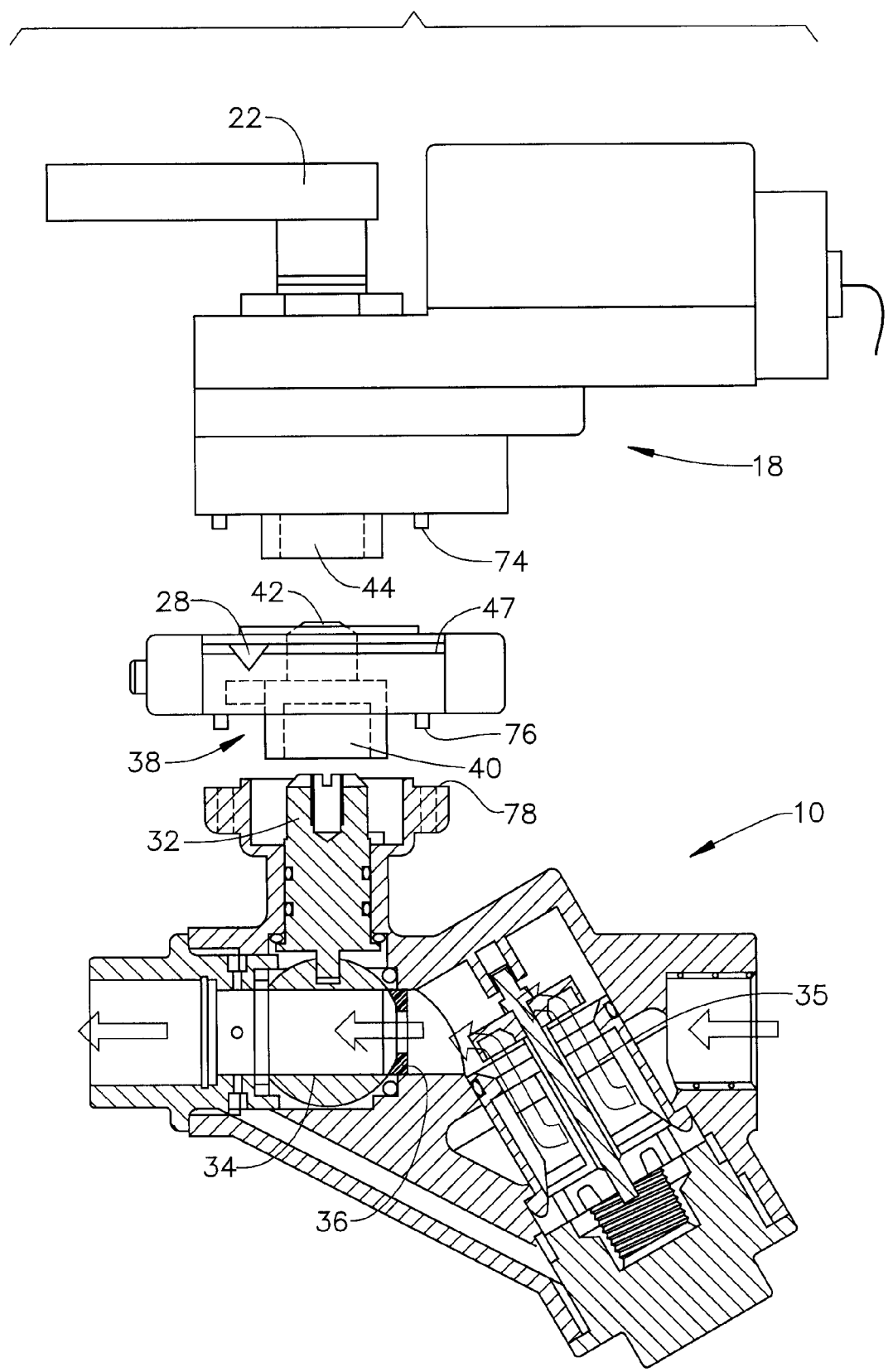
FIG. 2 is an exploded perspective assembly drawing, partly in section, for a preferred form of field adjustable actuated control valve of the invention, including an actuator, a field adjustment module and a pressure independent characterized control valve.

FIG. 2. is an exploded perspective assembly drawing, partly in section, for a preferred form of field adjustable actuated control valve of the invention, including an actuator 18, field flow adjustment mechanism 24 and a pressure independent characterized control valve 10. This view shows the means provided for operably engaging the control valve 10, the actuator 18, and field flow adjustment mechanism 24. The valve has a stem 32, which operably engages valve element ball 34. A regulator mechanism is shown as 35 and is of the the type described in U.S. Pat. No. 6,827,100, to Carlson, which is incorporated herein by reference. As can be seen in FIG. 2, a characterizing disc 36, of the type disclosed in U.S. Pat. No. 6,039,304, to Carlson, et al., (incorporated herein by reference) is provided to make flow from the valve proportional with movement of the valve stem 32. Arrows in the drawing illustrate the path of fluid through the valve 10. Field flow adjustment mechanism 24, includes a stem adaptor 38 having a valve stem coupler 40 at the bottom and a actuator coupler 42 at the top. Also shown in FIG. 2 is the actuator 18, having a flow adjustment mechanism coupler 44. The valve stem 32 will have a generally square cross section, which will fit tightly into the valve stem coupler 40 which provides a recess with a generally square cross section complimentary with the valve stem 32. The actuator coupler 42 will have a recess with a generally square cross section complimentary with the actuator coupler 42. These coupling elements are illustrated with configurations to mate with a complimentarily shaped member to which it is coupled, but the specific shapes of these elements can be varied as needed for particular applications. Not shown, but preferred to hold the assembly together, is a screw and a passage for it extending downward through the top of crank arm 22 then through the couplers just mentioned and is threadedly engaged with a suitable hole in the center of the valve stem.

Figure 3:
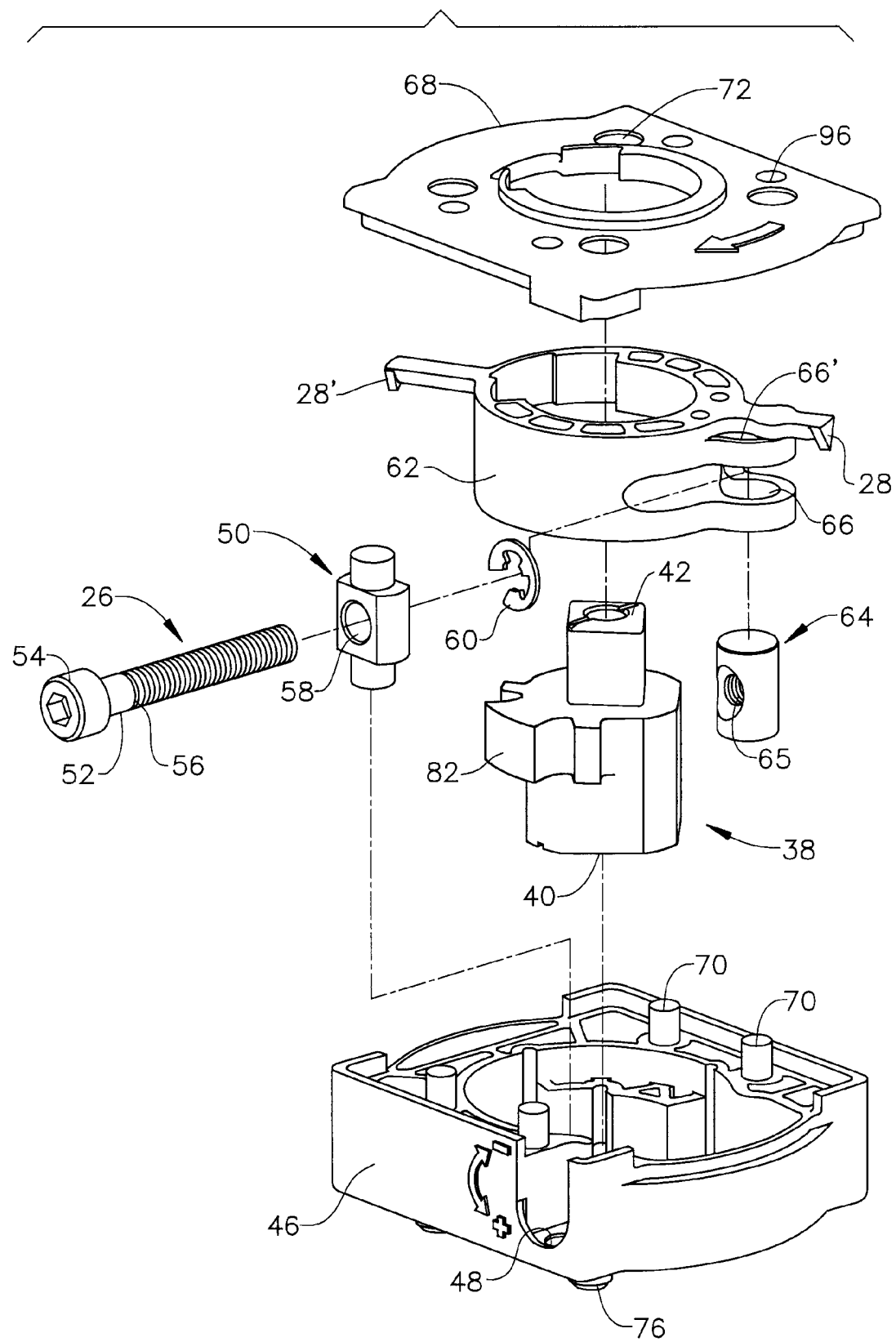
FIG. 3 is an exploded perspective assembly drawing for a preferred form of field adjustment module for an actuated control valve assembly of the invention.

FIG. 3 is an exploded perspective assembly drawing for a preferred form of field adjustment module 24 for an actuated control valve assembly of the invention. The dashed lines indicate the alignment of the various parts of the module 24. Starting from the bottom of the drawing, there is shown a housing 46 having a recess 48 open to the left side for holding swivel nut 50 which in turn holds adjustment screw 26. Reference to FIG. 1A shows adjustment screw 26 extending outwardly from the module 24. The adjustment screw 26 has an unthreaded section 52 between head 54 and peripheral slot 56, which permits the screw 26 to slide within the hole 58 extending through swivel nut 50 as it is held in place relative to it by snap washer 60. Stem adapter 38 is centrally located within the housing 46 and will transmit turning force from the actuator 18 to the valve stem 32 to the extent called for by the actuator and permitted by the mechanical stops of the field adjustment module 24, as will be described in greater detail below. In the drawing the screw 26 will pass in front of and not contact the stem adapter 38.

It will become apparent below that the stem adapter 38 moves by force applied by the actuator 18 and is limited in its radial motion by stops built into the housing 46 which cooperate with those on adjustable open stop 62 carriage. The screw 26 moves adjustable open stop 62 carriage by means of threaded pin 64 having threaded hole 65 which fits within openings 66 and 66' in the open stop 62. Thus, as the screw is rotated in the clockwise direction, the pin 64 is drawn toward the screw head 54, and the adjustable open stop 62 is likewise rotated clockwise.

A top cover plate 68 is attached to housing 46 by suitable means such as integral rivets 70 to hold the components of the field adjustment module 24 in place. The cover plate 68 is shown to have four seating recesses 72 which mate with seating pins 74 on the actuator. Similarly seating pins 76 extend from the bottom of housing for mating with seating recesses 78 in the valve 10. Other alignment means can be employed as desired. In fully assembled form, flow pointer 28 extends outwardly from the front of housing 46 through a slot 47 to point to the flow rate on scale 30 as set by an operator. An additional flow indicator 28' extends through the housing 46 in the rear.

Figure 4A:
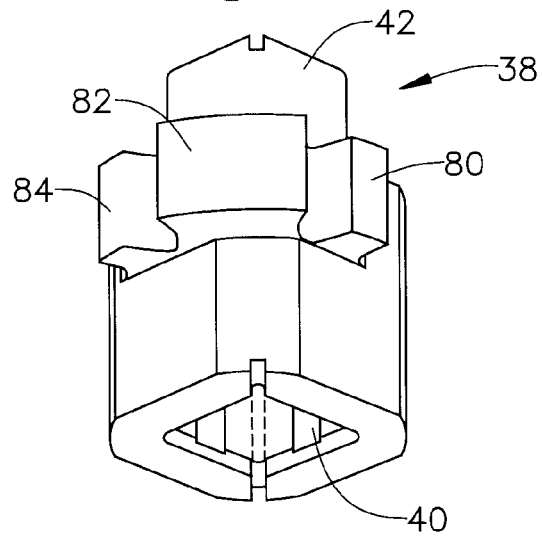
FIG. 4A is perspective view of a stem adaptor including open and closed stop cams for the field adjustment module shown in FIG. 3.
Figure 4B:
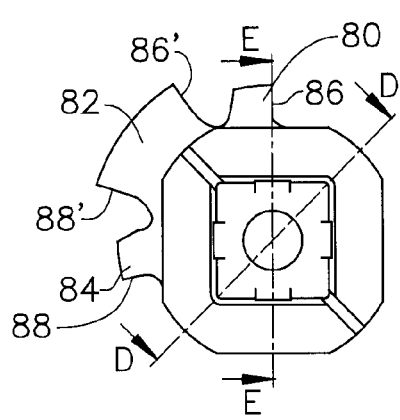
FIG. 4B is a bottom plan view of the stem adaptor for the field adjustment module.
Figure 4C:
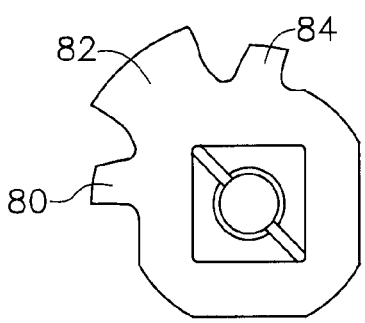
FIG. 4C is a top plan view of the stem adaptor for the field adjustment module.

FIG. 4A is perspective view of a stem adaptor 38 including open and closed stop cams for the field adjustment module shown in FIG. 3. Here the stem adaptor 38 is shown to include a valve stem coupler 40 at the bottom and an actuator coupler 42 at the top. Reference to FIG. 4B, which is a bottom plan view of the stem adaptor for the field adjustment module, and FIG. 4C, which is a top plan view of the stem adaptor for the field adjustment module, will aid in understanding the mechanism providing an adjustable degree of opening movement in relation to an offset closing position. Extending from the side of stem adaptor 38, is an array of flow setting stop fingers 80, 82 and 84. Finger 80 has an adaptor open stop surface 86 and finger 82 has adaptor open stop surface 86'. The provision of two stop surfaces is an important feature in assuring reliable long life by dividing the stress on the stop fingers 80, 82 and 84 of stem adaptor 38. In similar fashion, finger 84 includes one of two open stop surfaces 88, with the other 88' on finger 82.

Figure 4D:
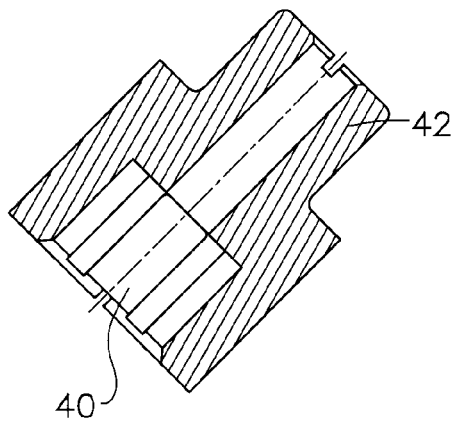
FIG. 4D is a cross sectional view of the stem adaptor taken along line D-D in FIG. 4B.
Figure 4E:
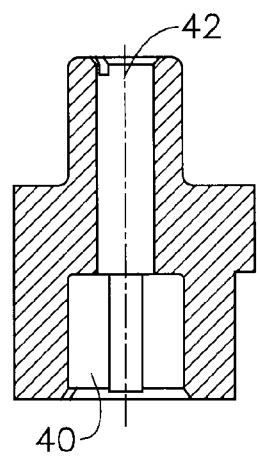
FIG. 4E is a cross sectional view of the stem adaptor taken along line E-E in FIG. 4B.

Reference to FIG. 4D, which is a cross sectional view of the stem adaptor taken along line D-D in FIG. 4B, and FIG. 4E, which is a cross sectional view of the stem adaptor taken along line E-E in FIG. 4B, will illustrate the valve stem coupler 40 and the actuator coupler 42 in greater detail. Again, both are essentially square in cross section, coupler 40 being female and 42 being male, thereby easily adapting to be placed between actuators and valves currently meant for use in pairs to provide added functionality to each. The specific shapes can be selected to meet specific needs.

Figure 5A:
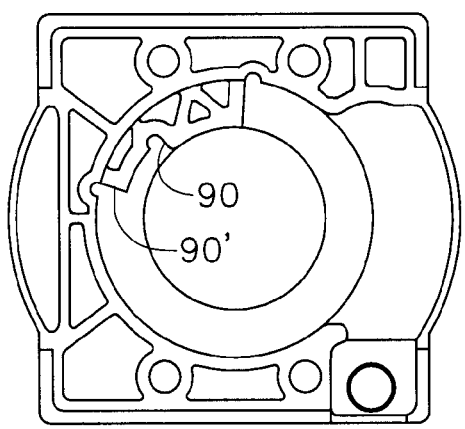
FIG. 5A is a top plan view of a housing for the field adjustment module shown in FIG. 3.
Figure 5B:
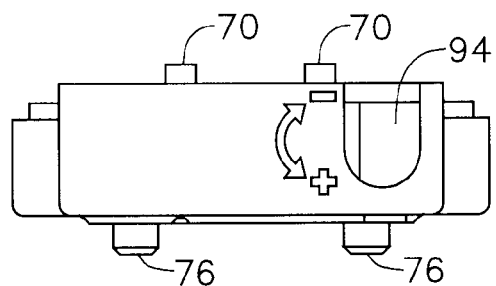
FIG. 5B is a left side elevation view of a housing for the field adjustment module.
Figure 5C:
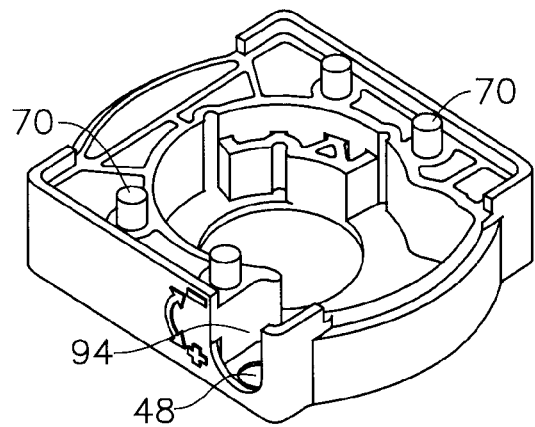
FIG. 5C is perspective view from the top, showing the left side and front, of a housing for the field adjustment module.
Figure 5D:
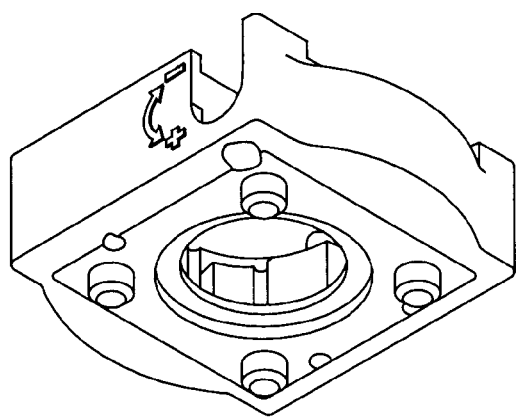
FIG. 5D is perspective view from the bottom, showing the left side and front, of a housing for the field adjustment module.

Reference is now made to FIGS. 5A to 5D to understand the housing 46 for the field adjustment mechanism 24 of the invention. FIG. 5A is a top plan view of a housing 46 for the field adjustment mechanism module 24 shown in FIG. 3. Here are seen housing closed stop surfaces 90, 90', which provide contact for adaptor closed stop surfaces 88, 88' and stop the movement of actuator coupler 42 in the closed position. Thus, in this preferred embodiment, the closed position is preset at the factory to eliminate any desired degree of the typical excess rotation (e.g., 12°) resulting in a closed position that is offset and, thereby, improve control resolution and system accuracy. Reference to FIG. 5B, which is a left side elevation view of a housing 46, shows an opening 94 for access to the head 54 of screw adjustment 26, which preferably extends outwardly of the housing for ease of access. FIG. 5C, which is perspective view from the top, showing the left side and front, of a housing 46, illustrates these same features in perspective to aid in understanding. FIG. 5D, which is perspective view from the bottom, showing the left side and front, of a housing 46, is also helpful and shows clearly an arrangement of housing seating pins 76 to assure proper alignment with mating seats 78 on the valve 10. A turn indicator 96 is provided on the housing to clarify that the normal clockwise to close direction is maintained for this particular mechanism. Not shown is scale 30 as illustrated in FIG. 1, which may be suitably arranged on the housing 46, preferably in front.

Figure 6A:
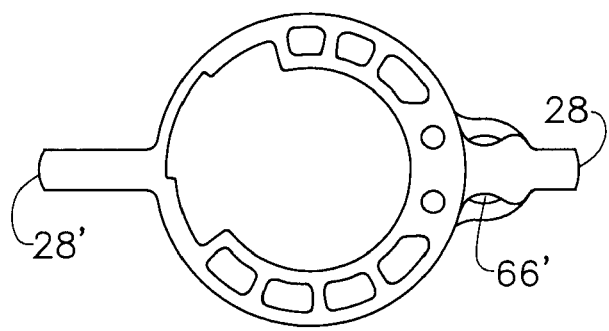
FIG. 6A is a top plan view of a pivotable open stop member for the field adjustment module shown in FIG. 3.
Figure 6B:
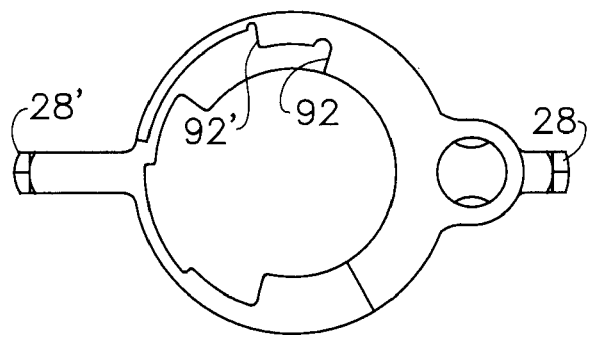
FIG. 6B is a bottom plan view of a pivotable open stop member for the field adjustment module.
Figure 6C:
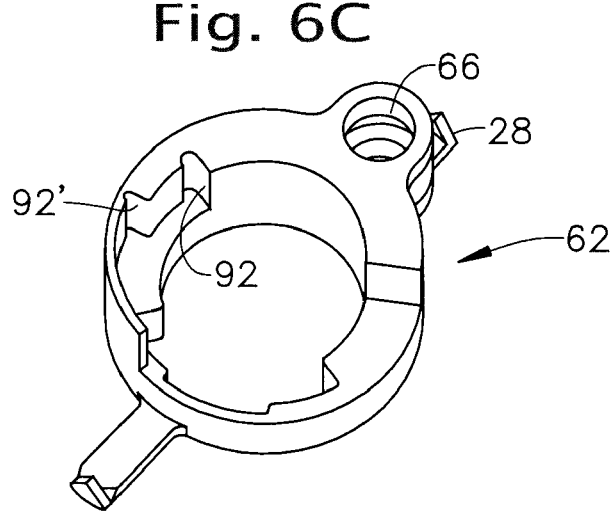
FIG. 6C is a perspective view from the bottom, showing the right side and rear of a pivotable open stop member for the field adjustment module.
Figure 6D:
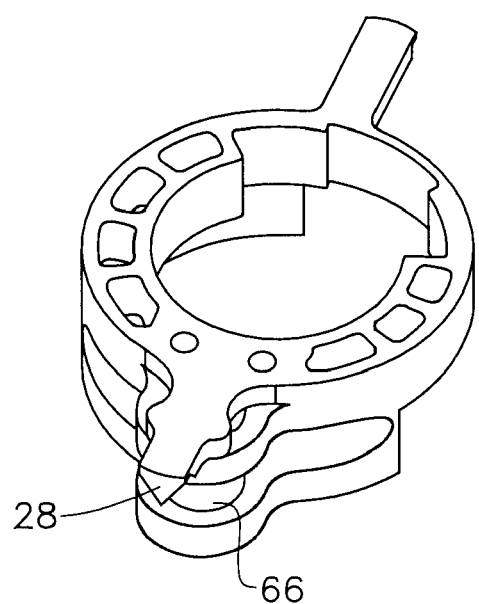
FIG. 6D is a perspective view from the top, showing the right side and front of a pivotable open stop member for the field adjustment module.
Figure 6E:
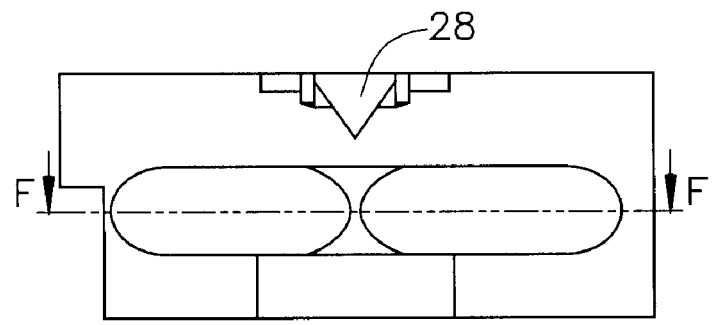
FIG. 6E is a front elevation view of a pivotable open stop member for the field adjustment module.
Figure 6F:
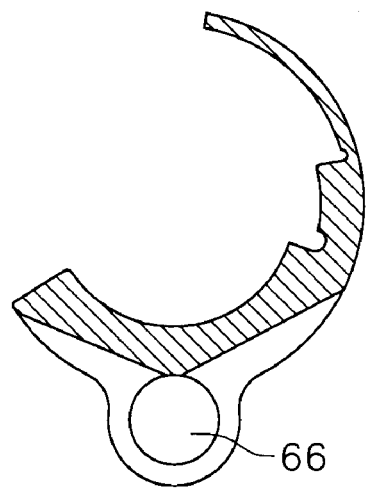
FIG. 6F is a cross sectional view taken along line F-F in FIG. 6E of a pivotable open stop member for the field adjustment module.
Figure 6G:
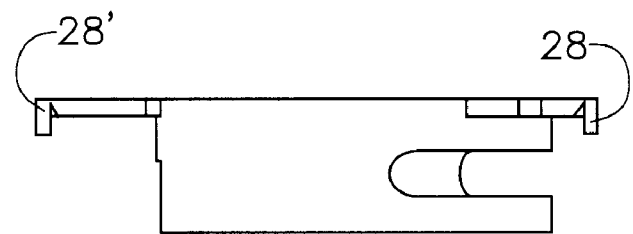
FIG. 6G is a left side elevation view of a pivotable open stop member for the field adjustment module.

FIGS. 6A to 6G show the pivotable open stop member 62, which can be moved to varying degrees in the field by adjustment of screw 26 to move the open stop through a wide range of positions to permit positive control of the maximum open position and thereby set the maximum flow rate for the valve 10. FIG. 6A, which is a top plan view of a pivotable open stop member for the field adjustment mechanism module 24 shown in FIG. 3, shows indicators 28 and 28' at opposite sides, both having the length selected to extend outside the housing provide positive visual indication of the degree of opening set. Openings 66 and 66' are visible in this set of figures to help understand how the threaded pin 64 is held by the pivotable open stop member 62 and can be moved by the adjustment of screw 26. FIG. 6B is a bottom plan view of the pivotable open stop member 62 and shows open stop surfaces 92 and 92', which are designed to mate with stop surfaces 86 and 86' on the actuator coupler 42 and thereby limit its further movement. Some of these features can be seen in more clarity by viewing FIG. 6C, which is a perspective view from the bottom, showing the right side and rear, and FIG. 6D, which is a perspective view from the top, showing the right side and front. Also, FIG. 6E is a front elevation view, FIG. 6F is a cross sectional view taken along line F-F in FIG. 6E and FIG. 6G is a left side elevation view.

Figure 7A:
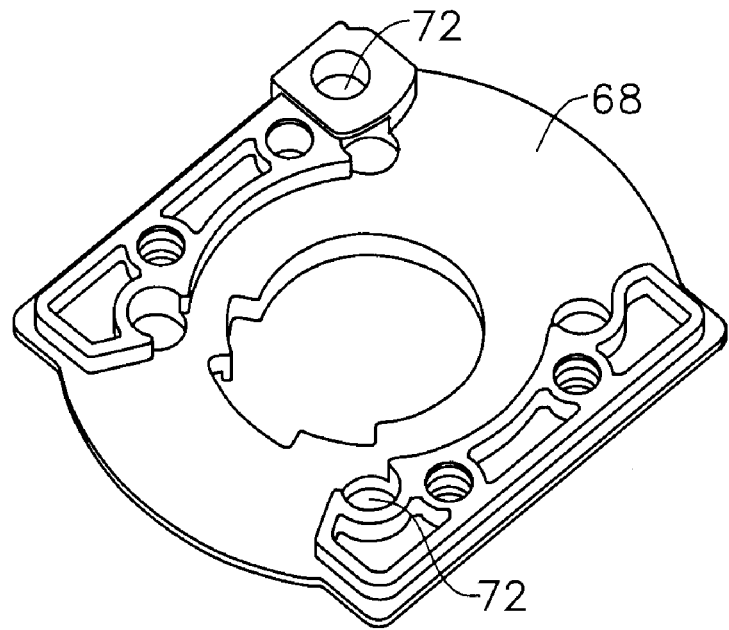
FIG. 7A is perspective view from the bottom, showing the left side and rear, of a housing top cover plate for the field adjustment module.
Figure 7B:
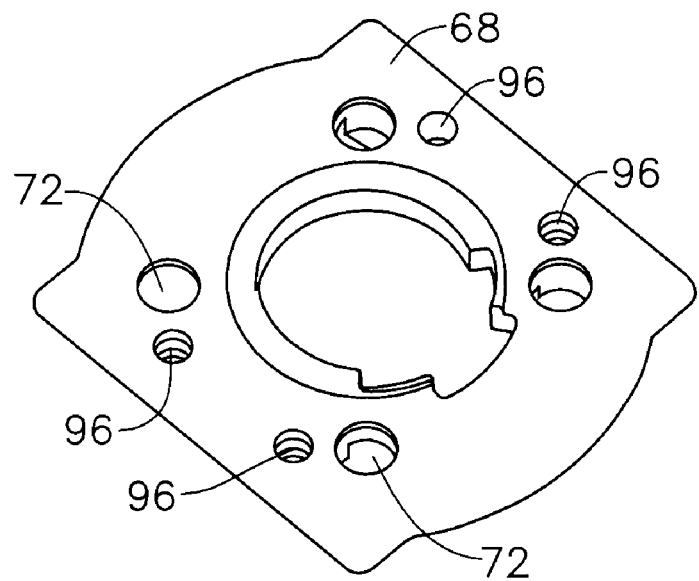
FIG. 7B is perspective view from the top, showing the right side and rear, of a housing cover plate for the field adjustment module.

Finally, FIG. 7A is perspective view from the bottom, showing the left side and rear, of a housing 46 and FIG. 7B is perspective view from the top, showing the right side and rear, of the housing top cover plate 68, which has recesses 96 for attachment to housing 46 by integral rivets 70 to hold the components of the field adjustment module 24 in place. It also has housing seating recesses 72 for engagement with actuator seating pins 74.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims. The claims are meant to cover the indicated elements and steps in any arrangement or sequence that is effective to meet the objectives intended for the invention, unless the context specifically indicates the contrary.

The invention claimed is:

1. A control valve assembly, comprising:
   (a) a control valve having a valve stem operably engaged with a valve element to move the valve element between open and closed positions by rotary movement of the valve stem;
   (b) a control valve actuator operably engaged with said valve stem to rotate said valve stem;
   (c) a field adjustment mechanism comprising a housing with an attached cover plate and a bottom enclosing a pivotally adjustable open stop carriage including a flow pointer extending outwardly from the housing, a stem adapter centrally located within the housing, an adjustment screw passing in front of and not contacting said stem adapter to pivot said adjustable open stop carriage and the included flow pointer, said field adjustment mechanism being operably engaged with both said valve stem and said actuator to enable adjustment of the movement of said valve stem by said actuator, whereby maximum open flow through the valve can be set to a predetermined maximum rate by rotation of said adjustment screw.

2. A control valve assembly according to claim 1, wherein the adjustment screw is connected to said open stop carriage by means of a pin that fits in the open stop carriage.

3. A control valve assembly according to claim 1, wherein said control valve includes a characterizing disc to make flow from the valve proportional with the movement of the valve stem and said flow pointer indicates the flow rate set on a scale.

4. A control valve assembly according to claim 1, wherein the control valve is a pressure independent characterized control valve.

5. A control valve assembly according to claim 1, wherein said stem adaptor links the valve stem and the control valve actuator and comprises at least one stop surface for engaging with open stop surfaces on said open stop carriage.

6. A field adjustment mechanism for a control valve, comprising:
   (a) a housing with an attached cover plate and a bottom enclosing a pivotally adjustable open stop carriage including a flow pointer extending outwardly from the housing, a stem adapter centrally located within the housing,
   (b) means for engaging a drive shaft of a control valve actuator;
   (c) means for engaging a control valve stem; and
   (d) an adjustment screw passing in front of and not contacting said stem adapter to pivot said adjustable open stop carriage and the included flow pointer, whereby movement of said adjustment screw moves said pivotally adjustable open stop carriage and thereby adjusts the movement of said valve stem by said actuator to a predetermined maximum rate.

7. A field adjustment mechanism for a control valve according to claim 6, wherein the adjustment screw is connected to said open stop carriage by means of a pin that fits in the open stop carriage.

8. A field adjustment mechanism for a control valve according to claim 6, wherein said control valve includes a characterizing disc to make flow from the valve proportional with the movement of the valve stem and said flow pointer indicates the flow rate set on a scale.

9. A field adjustment mechanism for a control valve according to claim 6, wherein the control valve is a pressure independent characterized control valve including a characterizing disc to make flow from the valve proportional with the movement of the valve stem.

10. A field adjustment mechanism for a control valve according to claim 6, wherein said stem adaptor links the valve stem and the control valve actuator and comprises at least one stop surface for engaging with open stop surfaces on said open stop carriage.

11. A control valve actuator which is enabled for field adjustment, comprising:
   (a) a control valve actuator including drive shaft means for engagement with a field adjustment mechanism; and
   (b) a field adjustment mechanism comprising
      a housing with an attached cover plate and a bottom enclosing a pivotally adjustable open stop carriage including a flow pointer extending outwardly from the housing, a stem adapter centrally located within the housing, stem adapter means for engagement with said drive shaft of said control valve actuator and a valve stem of a control valve, an adjustment screw passing in front of and not contacting said stem adapter to pivot said adjustable open stop carriage and the included flow pointer, and whereby movement of said adjustment screw moves said adjustable open stop carriage and thereby adjusts to a predetermined maximum rate the movement which said actuator can exert on said valve stem.

12. A control valve actuator according to claim 11, wherein the adjustment screw is connected to said open stop carriage by means of a pin that fits in the open stop carriage.

13. A control valve actuator according to claim 11, wherein the pointer indicates the flow rate set on a scale.

14. A control valve actuator according to claim 11, wherein the control valve includes a characterizing means to make flow from the valve proportional with the movement of the valve stem and the valve is a pressure independent control valve.

15. A control valve actuator according to claim 11, wherein a stem adaptor the valve stem and the control valve actuator comprises at least one stop surface for engaging with open stop surfaces on said open stop carriage.

16. A control valve which is enabled for field adjustment to set a predetermined open stop position, comprising:
(a) a control valve comprising
a valve body defining an inlet and an outlet,
a valve element positioned between said inlet and said outlet and having an opening therethrough,
characterizing means to make flow from the valve proportional with the movement of the valve stem and the valve,
a valve stem operably engaged with said valve element to rotate said valve element within said valve body; and
(b) a field adjustment mechanism comprising
a housing with an attached cover plate and a bottom enclosing a pivotally adjustable open stop carriage including a flow pointer extending outwardly from the housing, a stem adapter centrally located within the housing, wherein said stem adapter means engage with a drive shaft of a control valve actuator and said valve stem of said control valve,
an adjustment screw passing in front of and not contacting said stem adapter to pivot said adjustable open stop carriage and the included flow pointer, and
said pivotally adjustable open stop carriage is adjusted by said screw to provide a maximum rate the movement which said actuator can exert on said valve stem.

17. A control valve according to claim 16, wherein the adjustment screw is connected to said open stop carriage by means of a pin that fits in the open stop carriage.

18. A control valve according to claim 16, wherein said pointer indicates the flow rate set on a scale.

19. A control valve according to claim 16, wherein the control valve includes a characterizing means to make flow from the valve proportional with the movement of the valve stem and the valve is a pressure independent characterized control valve.

20. A control valve according to claim 16, wherein said stem adaptor links the valve stem and the control valve actuator and comprises at least one stop surface for engaging open stop surfaces on said open stop carriage.

* * * * *